United States Patent
Baek et al.

(10) Patent No.: US 11,078,581 B2
(45) Date of Patent: Aug. 3, 2021

(54) CATALYST COMPOSITE AND METHOD FOR MANUFACTURING THE SAME

(71) Applicant: Ulsan National Institute of Science and Technology (UNIST), Ulasan (KR)

(72) Inventors: Jong Beom Baek, Ulsan (KR); Seok Jin Kim, Ulsan (KR); Javeed Mahmood, Ulsan (KR); Feng Li, Ulsan (KR)

(73) Assignee: UNIST (Ulsan National Institute of Science and Technology), Ulsan (KR)

( * ) Notice: Subject to any disclaimer, the term of this patent is extended or adjusted under 35 U.S.C. 154(b) by 471 days.

(21) Appl. No.: 15/769,658

(22) PCT Filed: Jun. 16, 2017

(86) PCT No.: PCT/KR2017/006289
§ 371 (c)(1),
(2) Date: Apr. 19, 2018

(87) PCT Pub. No.: WO2018/155767
PCT Pub. Date: Aug. 30, 2018

(65) Prior Publication Data
US 2020/0240026 A1    Jul. 30, 2020

(30) Foreign Application Priority Data

Feb. 22, 2017  (KR) .................... 10-2017-0023472

(51) Int. Cl.
*C25B 11/051* (2021.01)
*C25B 1/04* (2021.01)
*C25B 11/057* (2021.01)
*C25B 11/075* (2021.01)

(52) U.S. Cl.
CPC .............. *C25B 11/051* (2021.01); *C25B 1/04* (2013.01); *C25B 11/057* (2021.01); *C25B 11/075* (2021.01)

(58) Field of Classification Search
CPC ... C25B 11/0405; C25B 1/04; C25B 11/0415; C25B 11/0447
USPC ....................................................... 502/159
See application file for complete search history.

(56) References Cited

U.S. PATENT DOCUMENTS

2006/0213331 A1* 9/2006 Otsuka .................... C01B 3/061
75/627
2012/0270141 A1  10/2012 Koshino et al.

FOREIGN PATENT DOCUMENTS

EP              2423241 A1 * 2/2012 .......... B01J 20/3206
KR    10-2012-0102649        9/2012
KR    10-2013-0129827       11/2013
(Continued)

OTHER PUBLICATIONS

English translation of EP2423241 (Year: 2012).*
(Continued)

*Primary Examiner* — Colin W. Slifka
(74) *Attorney, Agent, or Firm* — Workman Nydegger

(57) ABSTRACT

Disclosed are a catalyst composite including a metal; and a nitrogen-containing porous 2D polymer carrier, and a method of manufacturing the catalyst composite. Accordingly, provided is a high-efficiency catalyst composite that does not depend on pH acid concentration using a nitrogen-containing porous two-dimensional (2D) polymer carrier and a low-cost metal.

15 Claims, 11 Drawing Sheets

(56) References Cited

FOREIGN PATENT DOCUMENTS

KR  10-2017-0014093  2/2017

OTHER PUBLICATIONS

Wang et al. [J. Am. Chem. Soc. 2011, 133, 2362-2365] (Year: 2011).*

Wang et al. [Angew. Chem. Int. Ed. 2012, 51, 68-89] (Year: 2012).*

Lee et al, First principles study of spin polarization in Fe-doped monolayer C2N-h2D, Mar. 3, 2016 (Year: 2016).*

Lee et al, First principles study of spin polarization in Fe-doped monolayer C2N-h2D, Mar. 3, 2016- abstract-hhttps://www.koreascience.or.kr/article/CFKO201628433155372.page (Year: 2016).*

International Search Report and Written Opinion dated Nov. 22, 2017, issued in PCT Application No. PCT/KR2017/006289, filed Jun. 16, 2017.

Javeed Mahmmod et al., *Cobalt Oxide Encapsulated in $C_2N$-h2D network Polymer as a Catalyst for Hydrogen Evolution*, Chemistry of Materials, 2015, pp. 4860-4864.

Cheng-Hong Liu et al., *Hydrogen Generation from Hydrolysis of Sodium Borohydride Using Ni—Ru Nanocomposite as Catalysts*, International Journal of Hydrogen Energy, 34, 2009, pp. 2153-2163.

Ruquan Ye et al., *High Performance Electrocatalytic Reaction of Hydrogen and Oxygen on Ruthenium Nanoclusters*, ACS Applied Materials & Interfaces, 2017, vol. 9, No. 4, pp. 3785-3791.

Javeed Mahmmod et al., *An Efficient and pH-Universal Ruthenium-Based Catalyst for the Hydrogen Evolution Reaction*, Nature Nanotechnology, vol. 12, May 2017, pp. 441-446.

Zhe Chen et al., *Ruthenium/Graphene-like Layered Carbon Composite as an Efficient Hydrogen Evolution Reaction Electrocatalyst*, American Chemical Society, pp. 35135-35137, Abstract only.

Jincheng Bai et al., *Nitrogen-doped Graphene as Catalysts and Catalyst Supports for Oxygen Reduction in Both Acidic and Alkaline Solutions*, International Journal of Hydrogen Energy, vol. 38, No. 3, 2013, pp. 1413-1418, Abstract only.

Zhenhai Wen et al., *Nitrogen-Enriched Core-Shell Structured $Fe/Fe_3C$—C Nanorods as Advanced Electrocatalysts for Oxygen Reduction Reaction*, Material Views.com, vol. 24, 2012, pp. 1399-1404.

Gui-Qin Zhang et al., *A New Air Electrode Based on Carbon Nanotubes and Ag—$MnO_2$ for Metal Air Electrochemical Cells*, Science Direct, Carbon, vol. 42, 2004, pp. 3097-3102.

Brian C. H. Steele et al., *Material for Fuel-Cell Technologies*, Insight Review Articles, vol. 414, Nov. 15, 2001, pp. 345-352.

Byungkwon Lim et al., *Pd—Pt Bimetallic Nanodendrites with High Activity for Oxygen Reduction*, Science, vol. 324, Jun. 5, 2009, pp. 1302-1305.

Kuanping Gong et al., *Nitrogen-Doped Carbon Nanotube Arrays with High Electrocatalytic Activity for Oxygen Reuction*, Science, vol. 323, Feb. 6, 2009, pp. 760-763.

\* cited by examiner

CATALYST COMPOSITE AND METHOD FOR MANUFACTURING THE SAME

TECHNICAL FIELD

At least one example embodiment relates to a catalyst composite and a method of manufacturing the catalyst composite.

RELATED ART

An electrochemical catalyst is essential for pure and sustainable energy technology, such as a fuel cell and a metal-air cell. (Wen Z et al., advanced materials 24, 2014, 1399-1404; Zhang et al., Carbon 42, 2004, 30973102).

A platinum (Pt)-based material has been regarded as the most efficient catalyst in an oxygen reduction reaction (ORR) of a fuel cell (Steele et al., Nature 414, 2001, 345-352; Lim B et al., Science 324, 2009, 1302-1305). The Pt-based material has some constraints in preservation due to its sensitivity to fuel crossover and carbon monoxide poisoning, and also has some limits in commercialization in terms of a large-scale air-breathing electrode due to its very high price (Gong et al., Science 323, 2009, 760-764).

A hydrogen evolution reaction (HER) is a most important process in an electrochemical water decomposition reaction and an electrochemical catalyst is applied thereto. To achieve a success in a practical application field, excellent durability, high efficiency, and price competiveness are required. In addition, a catalyst needs to proceed with proton reduction with a minimum overpotential and quick reaction to produce an effective HER. However, catalysts used for the HER are expensive precious metals and have poor stability in a non-acidic environment and a mass-production of hydrogen may be difficult using the catalysts.

For example, a most efficient catalyst in an acidic environment may be a Pt-based catalyst and shows a quickest reaction speed with strong Pt—H binding. However, the precious metal such as platinum is expensive and has a low stability in a non-acidic environment. To solve the above issues, studies on non-metal-based catalysts are ongoing. However, they have a corrosion issue in the acidic environment. In addition, compared to platinum, they have a low performance due to a relatively high overpotential and have some issues in terms of cost and productivity.

DETAILED DESCRIPTION

Subject

At least one example embodiment provides a catalyst composite having an excellent catalytic activity, excellent pH stability, high efficiency, and excellent durability.

At least one example embodiment also provides a method of manufacturing the catalyst composite.

Matters to be outperformed by the example embodiments are not limited thereto and other matters not described herein may be clearly understood by one of ordinary skill in the art from the following description.

Solution

According to an aspect of at least one example embodiment, there is provided a catalyst composite including a metal; and a nitrogen-containing porous two-dimensional (2D) polymer carrier.

According to an example embodiment, the nitrogen-containing porous 2D polymer carrier may be a 2D porous organic produced through a cyclization reaction of an amine-based compound; and at least one of a ketone-based compound, an aldehyde-based compound, and a carboxylic acid-based compound, 2D porous carbon nitride, or both thereof.

According to an example embodiment, the amine-based compound may include at least one selected from the group consisting of hexaaminobenzene, hexaaminobenzene (HAB) trihydrochloride, triphenylene hexaamine triptycene hexamine, tetraaminobenzene, p-phenylenediamine, m-phenylenediamine, aromatic diamine, melamine, adamantanetetraamine, ethylenediamine), pyridinetetramine, 1,3,5-tris(4-aminophenyl)benzene, [1,1'-biphenyl]-3,3',4,4'-tetraamine, naphthalene-tetraamine, 4,4'-oxydianiline, 4,4'-thiodianiline, 4,4'-thiobis(benzene-1,2-diamine, 4,4'-oxybis(benzene-1,2-diamine, pyrenediamine, pyrenetetramine, and 4,4',4'',4'''-methanetetrayltetraaniline.

According to an example embodiment, the ketone-based compound may include at least one of hexaketocyclohexane, hexaketocyclohexane (HKH) octa hydrate, tetraketone, and pyreneteteraketone, the aldehyde-based compound may include at least one of benzenedialdehyde and benzenetrialdehyde, and the carboxylic acid-based compound may include at least one of benzenedicarboxylic acid, benzenetricarboxylic acid, benzenetetracarboxylic acid, benzenehexacarboxylic acid, pyromellitic dianhydride, mellitic anhydride, cyclobutane-1,2,3,4-tetracarboxylic dianhydride, perylenetetracarboxylic dianhydride, naphthalenetetracarboxylic dianhydride, perylenetetracarboxylic acid, and naphthalenetetracarboxylic acid.

According to an example embodiment, the metal may include a metal particle having a particle size of 100 nm or less.

According to an example embodiment, the metal may include at least one selected from the group consisting of ruthenium (Ru), cerium (Ce), iron (Fe), rhodium (Rh), palladium (Pd), cobalt (Co), nickel (Ni), gold (Au), silver (Ag), manganese (Mn), zinc (Zn), copper (Cu), and molybdenum (Mo).

According to an example embodiment, the metal may include at least one selected from the group consisting of ruthenium (Ru); and cerium (Ce), iron (Fe), rhodium (Rh), palladium (Pd), cobalt (Co), nickel (Ni), gold (Au), silver (Ag), manganese (Mn), zinc (Zn), copper (Cu), and molybdenum (Mo), and a mixture ratio of the ruthenium to another metal may be a molar ratio of 1:0.01 to 0.5.

According to an example embodiment, the catalyst composite may be a hydrogen evolution reaction (HER) catalyst.

According to an example embodiment, the catalyst composite may have a catalytic activity for hydrogen evolution reaction in an area of pH 1 to 14 area.

According to another aspect of at least one example embodiment, there is provided a method of manufacturing a catalyst composite, the method including obtaining a reaction mixture by mixing a precursor of porous 2D polymer and a metal precursor in a solvent; performing a primary reflux on the reaction mixture; and performing a secondary reflux after adding a reducing agent.

According to an example embodiment, the precursor of the porous 2D polymer may include an amine-based compound; and at least one of a ketone-based compound, an aldehyde-based compound, and a carboxylic acid-based compound.

According to an example embodiment, a mixture ratio of the amine-based compound to at least one of a ketone-based compound, an aldehyde-based compound, and a carboxylic acid-based compound may be a molar ratio of 1:0.5 to 3.

According to an example embodiment, the metal precursor may include at least one selected from the group consisting of a halogen salt, a phosphate salt, a nitrate salt, a sulfate salt, an ammonium salt, an acetate salt, and a carbonate salt of a metal.

According to an example embodiment, a mixture ratio of the precursor of the porous 2D polymer to the metal precursor may be a molar ratio of 1:0.01 to 0.5.

According to an example embodiment, the reducing agent may include at least one selected from the group consisting of NaBH4, NaAlH4, LiBH4, LiAlH4, hydrazine, KBH4, and LiBH4.

According to an example embodiment, the catalyst manufacturing method may further include thermally treating a product obtained after performing the secondary reflux.

According to an example embodiment, the thermally treating may include thermally treating the product in an inert gas atmosphere and at the temperature of 400° C. or more.

According to an example embodiment, the performing of the primary reflux may perform the reflux for one hour to five hours at the temperature of 100° C. to 200° C.

According to an example embodiment, the performing of the secondary reflux may perform the reflux for one hour to five hours at the temperature of 100° C. to 200° C.

According to another aspect of at least one example embodiment, there is provided a hydrogen production method including producing hydrogen ions with a hydrogen evolution reaction (HER) using an HER catalyst that includes the catalyst composite.

Effect of Invention

According to example embodiments, there may be provided a catalyst composite having an industrial value due to its relatively excellent performance and durability compared to an existing precious metal-based catalyst. Also, the catalyst composite may provide an excellent catalyst activity within various pH ranges since it does not depend on pH acid concentration.

According to example embodiments, it is possible to enhance the economic feasibility of hydrogen production through application to a hydrogen evolution reaction (HER) and to provide a mass production possibility.

BEST MODE

Figure 1:
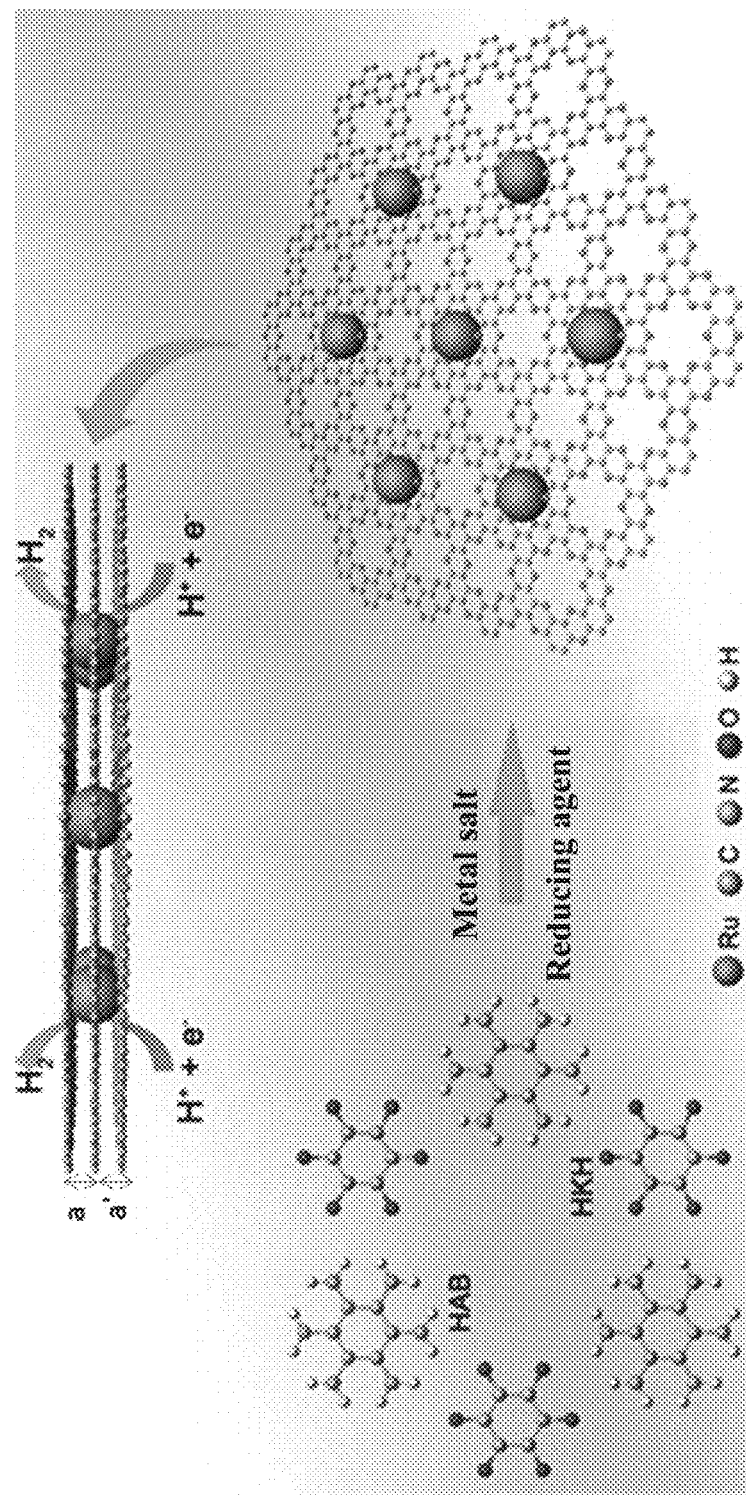
FIG. 1 illustrates an example of a structure of a catalyst composite according to an example embodiment.

Hereinafter, example embodiments will be described with reference to the accompanying drawings. When it is deemed that the detailed description related to a relevant known function or configuration may make the purpose of the example embodiments unnecessarily ambiguous describing the example embodiments, the detailed description will be omitted here. Also, terminologies used herein are used to appropriately describe the example embodiments and thus may vary based on a user, the intent of an operator, or a custom to which the disclosure pertains. Accordingly, the terminologies must be defined based on the following overall description of this specification Like elements illustrated in the drawings refer to like elements throughout. At least one example embodiment relates to a catalyst composite. The catalyst composite may include a metal; and a two-dimensional (2D) porous polymer carrier, and may provide excellent durability and catalyst performance.

According to an example embodiment, the catalyst composite may include a metal; and a nitrogen-containing porous 2D polymer carrier.

For example, the metal may be contained in the 2D porous polymer carrier, and may include a low-cost metal. For example, the metal may include at least one selected from the group consisting of ruthenium (Ru), cerium (Ce), iron (Fe), rhodium (Rh), palladium (Pd), cobalt (Co), nickel (Ni), gold (Au), silver (Ag), manganese (Mn), zinc (Zn), copper (Cu), and molybdenum (Mo). Compared to an existing precious metal, when producing a composite with a 2D porous polymer carrier, the metal may provide stable catalytic activity within various pH ranges without depending on pH and may also provide low overpotential and excellent catalytic activity. For example, the metal may stably operate without degrading performance in alkaline and acidic environments, and may provide a hydrogen evolution reaction (HER) activity enhanced compared to the precious metal. For example, the metal may be included in the catalyst composite in an atom, ion, and/or particle form. For example, the metal may include metal particles each having a particle size of 100 nm or less; 0.1 nm to 100 nm; 1 nm to 50 nm; 1 nm to 10 nm; 2 nm to 5 nm. Once the metal is included in the particle range, the metal may produce a stable composite with the nitrogen-containing porous 2D polymer carrier and may provide an appropriate catalytic activity area.

For example, the metal may have various shapes, such as a needle, a circular shape, a wire, a planar shape, and the like.

For example, the metal may be applied as a metal mixture of two or more types. In the metal mixture, a mixture ratio of a first metal to a second metal (remaining metals excluding the first metal) may be a molar ratio of 1:0.01 to 0.5; or 1:0.01 to 0.1. For example, the first metal may be ruthenium (Ru) and the second metal may be a metal excluding ruthenium (Ru). Once the metal mixture is included in a range of the mixture ratio, the metal mixture may provide a catalytic characteristic having high efficiency and excellent durability without depending on pH acid concentration.

For example, the nitrogen-containing porous 2D polymer carrier may include a 2D porous organic produced through a cyclization reaction of an amine-based compound; and at least one of a ketone-based compound, an aldehyde-based compound, and a carboxylic acid-based compound, 2D porous carbon nitride, or both thereof. A repetition unit formed through the cyclization reaction may be regularly or randomly polymerized and thereby arranged.

For example, the cyclization reaction may be [2+2], [2+3], or [3+3] reaction of an amine-based compound; and at least one of a ketone-based compound, an aldehyde-based compound, and a carboxylic acid-based compound. For example, 2D porous carbon nitride may be produced by thermally treating the 2D porous organic.

For example, if it is capable of performing the cyclization reaction with at least one of the ketone-based compound, the aldehyde-based compound, and the carboxylic acid-based compound, any type of the amine-based compound may be used. For example, the amine-based compound may include at least one selected from the group consisting of hexaaminobenzene, hexaaminobenzene (HAB) trihydrochloride, triphenylene hexaamine triptycene hexamine, tetraaminobenzene, p-phenylenediamine, m-phenylenediamine, aromatic diamine, melamine, adamantanetetraamine, ethylenediamine, pyridinetetramine, 1,3,5-tris(4-aminophenyl)benzene, ([1,1'-biphenyl]-3,3',4,4'-tetraamine), naphthalene-tetraamine, 4,4'-oxydianiline, 4,4'-thiodianiline, 4,4'-thiobis(benzene-1,2-diamine), 4,4'-oxybis(benzene-1,2-diamine), pyrenediamine, pyrenetetramine, and 4,4',4'',4'''-methanetetraryltetraaniline, however, is not limited thereto.

For example, if it is capable of reacting with an amine functional group of the amine-based compound, any type of the ketone-based compound, the aldehyde-based compound, and the carboxylic acid-based compound may be applied. For example, the ketone-based compound may include at least one of hexaketocyclohexane, hexaketocyclohexane (HKH) octa hydrate, tetraketone, and pyreneteteraketone, the aldehyde-based compound may include at least one of benzenedialdehyde and benzenetrialdehyde, and the carboxylic acid-based compound may include at least one of benzenedicarboxylic acid, benzenetricarboxylic acid, benzenetetracarboxylic acid, benzenehexacarboxylic acid, pyromellitic dianhydride, mellitic anhydride, cyclobutane-1,2,3,4-tetracarboxylic dianhydride, perylenetetracarboxylic dianhydride, naphthalenetetracarboxylic dianhydride, perylenetetracarboxylic acid, and naphthalenetetracarboxylic acid, however, are not limited thereto.

FIG. 1 illustrates an example of a structure of a catalyst composite according to an example embodiment. Referring to FIG. 1, the nitrogen-containing porous 2D polymer carrier is produced by a cyclization reaction of hexaketocyclohexane (HKH) octa hydrate monomer and hexaaminobenzene (HAB) trihydrochloride monomer, and includes a repetition unit in which six $C_2N$ hexagonal rings are arranged to form a hole in a crystal as shown in Formula 1. The repetition unit is regularly arranged to form a porous $C_2N$-h2D (holey 2D) crystal.

Formula 1

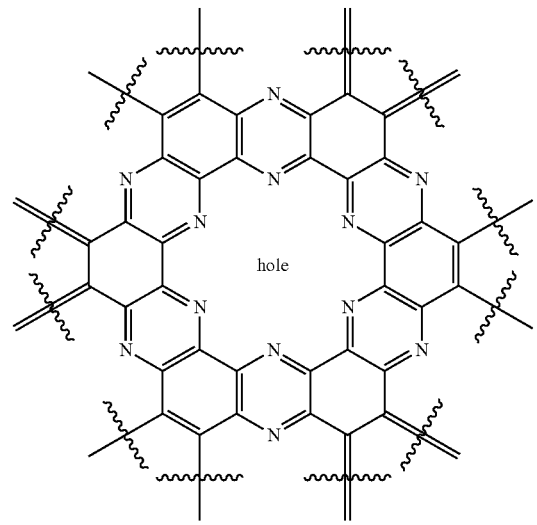

For example, the hole may include six nitride elements for providing a pore with a regular form and/or size, and encapsulating a metal. A diameter of the hole may be 0.1 nm or more; 0.1 nm to 100 nm; 0.1 nm to 10 nm; 0.8 nm to 1.5 nm; 0.8 nm to 0.1 nm; or 0.8 nm to 0.9 nm. The hole may provide a stable binding area between a large surface area of the catalyst composite and the metal and may also provide a conductive platform.

For example, the repetition unit in the structure of Formula 1 may be repeatedly arranged and a $C_2N$-h2D (holey 2D) crystal in which a single metal or a plurality of metals is arranged as expressed by Formula 2 may be formed on at least a portion of the structure, for example, the hole area. In Formula 2, M1 through M6 may refer to the same metal or different metals.

Formula 2

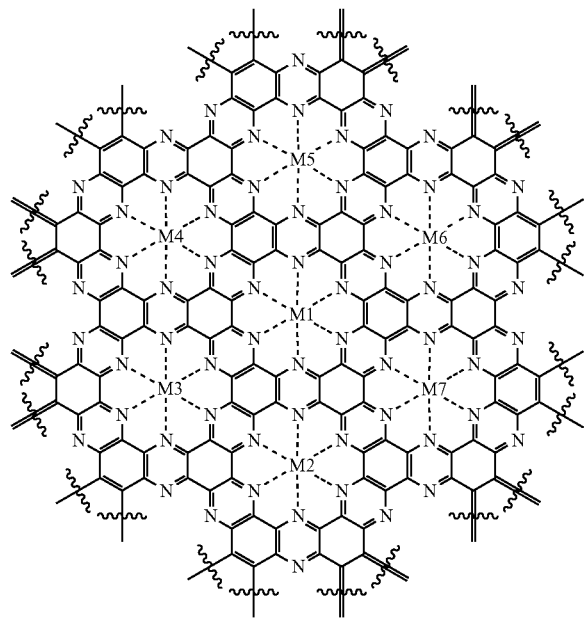

For example, FIG. 1, Formula 1, and Formula 2 are provided as examples only. In FIG. 1, Formula 1, and Formula 2, a shape of a repetition unit, a size of a hole, a number of repetition units, and the like may be variously adjusted based on types of the amine-based compound, the ketone-based compound, the aldehyde-based compound, and the carboxylic acid-based compound used for reaction, content thereof, a distribution thereof, a reaction condition thereof (a cyclization reaction condition and a polymerization condition, etc), and the like.

For example, referring to FIG. 1, in the catalyst composite, the nitrogen-containing porous 2D polymer carrier may constitute a layered structure in which a plurality of $C_2N$-h2D (hereinafter, $C_2N$ layer) crystal layers is stacked at intervals a and a' of 0.3 nm to 0.4 nm; or 0.32 nm to 0.36 nm. The intervals a and a' may be identical to each other or may differ from each other. The metal may be inserted and encapsulated between a plurality of $C_2N$ layers with being bound by nitrogen elements on at least a portion, for example, a hole area of each $C_2N$ layer.

For example, in the catalyst composite, a shape of the nitrogen-containing porous 2D polymer carrier may be variously modified. For example, the nitrogen-containing porous 2D polymer carrier may be provided in a shape of a plate type, a single wall or multiwall nano tube, a needle, and the like.

According to an example embodiment, the catalyst composite may provide a stable catalytic activity without depending on pH acid concentration. For example, the catalyst composite may provide an excellent catalytic activity in an area of pH 1 to 14; an area of pH 2 to 12; or an area of pH 3 to 10. For example, when the catalyst composite is applied to a hydrogen evolution reaction (HER) catalyst, the catalyst composite may provide an excellent catalyst performance at low overpotential and high efficiency in the area of pH 1 to 14 without causing the activity degradation with respect to the hydrogen evolution reaction (HER).

For example, the catalyst composite may exhibit the overpotential of 220 mV or less; 150 mV or less; 50 mV or less; 20 mV or less; 18 mV or less; 15 mV or less; 13 mV or less; or 10 mV or less in an acid area, an alkaline area, or both of the acid area and the alkaline area. For example, the overpotential in the acid area may be 15 mV to 13 mV, and the overpotential in the alkaline area may be 19 mV to 16 mV. For example, the overpotential may be associated with specific current density, for example, current density of 10 mA cm-2.

According to an example embodiment, the catalyst composite may be an electrochemical catalyst and may be applicable to various fields. For example, the catalyst composite may be applicable to an electrode material of a fuel cell and an HER catalyst.

For example, the HER catalyst includes the catalyst composite disclosed herein and thus, may operate within various pH ranges and may prevent a decrease in the catalyst efficiency according to the overpotential from occurring when producing hydrogen. Accordingly, it is possible to provide high durability and high efficiency and to enhance the economic feasibility of hydrogen production.

For example, the HER catalyst may include the catalyst composite alone, or may be a mixture of the catalyst composite and the HER catalyst applied in the technical field of the example embodiment.

The example embodiment relates to a method of manufacturing the catalyst composite. The catalyst composite manufacturing method may provide a stable catalytic activity without depending on pH acid concentration, and particularly, may provide the catalyst composite having high efficiency with respect to a hydrogen evolution reaction (HER).

Figure 2:
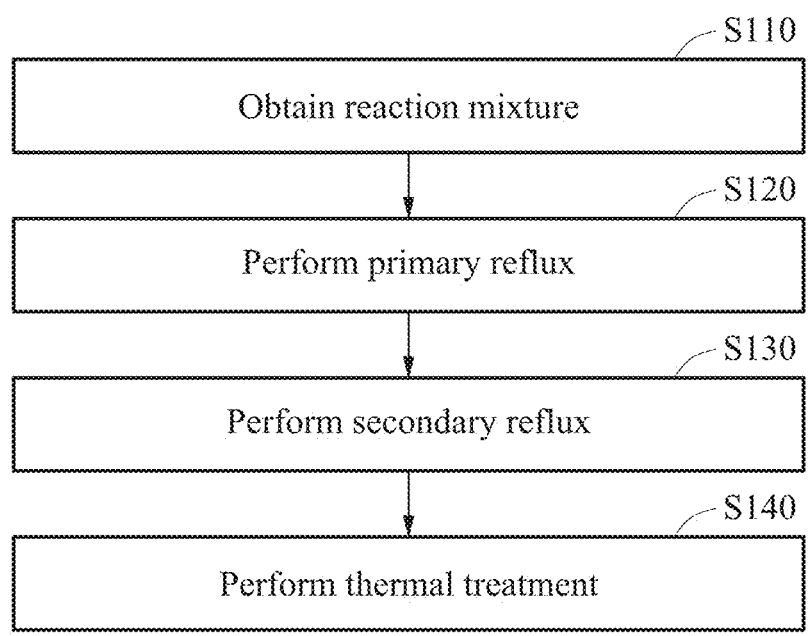
FIG. 2 is a flowchart illustrating an example of a method of manufacturing a catalyst composite according to an example embodiment.

FIG. 2 is a flowchart illustrating an example of a method of manufacturing a catalyst composite according to an example embodiment. Referring to FIG. 2, the catalyst composite manufacturing method may include operation S110 of obtaining a reaction mixture; operation S120 of performing a primary reflux; operation S130 of performing a secondary reflux; and operation S140 of performing a thermal treatment.

According to an example embodiment, operation S110 may be an operation of obtaining the reaction mixture by mixing a precursor of a porous 2D polymer and a metal precursor in a solvent.

For example, the precursor of the porous 2D polymer may include an amine-based compound; and at least one of a ketone-based compound, an aldehyde-based compound, and a carboxylic acid-based compound. A mixture ratio of the amine-based compound to the ketone-based compound, the aldehyde-based compound, and the carboxylic acid-based compound may be a molar ratio of 1:0.5 to 3. Once the mixture ratio is included in the range, the composite stable with a metal may be produced and an excellent catalytic activity may be provided.

For example, the metal precursor may be an organic salt or an inorganic salt of a metal, and may include at least one selected from the group consisting of, for example, a nitrate salt, a sulfate salt, an ammonium salt, an acetate salt, a phosphate salt, a carbonate salt, a halogen salt such as a fluoride salt and chloride salt of a metal, and the like.

For example, the metal precursor may include at least one selected from RuCl3, tris(bipyridine)ruthenium(II)chloride, ruthenocene, ruthenium(III)acetylacetonate, bis(cyclopentadienyl)ruthenium(II), bis(ethenylcyclopentadienyl)ruthenium(II), chlorocyclopentadienylbis(triphenylphosphine)ruthenium(II), ruthenium(III) nitrosyl nitrate solution, dichloro (1,5-cyclooctadiene)ruthenium(II), tris (bathophenanthrolinedisulfonate)ruthenium(II), tris(2,2'- bipyridine)ruthenium(II) hexafluorophosphate, ethylenediaminetetraacetic acid ruthenium(III) chloride, dihydridotetrakis(triphenylphosphine)ruthenium(II), chloro(indenyl)bis(triphenylphosphine)ruthenium(II), bis(2,2'-bipyridine)-(5-isothiocyanato-phenanthroline)ruthenium, bis(hexafluorophosphate), tris(2,2'-bipyridyl-d8)ruthenium(II) hexafluorophosphate, dichloro[(2,6,10-dodecatriene)-1,12-diyl]ruthenium(IV), diisopropylphosphino)-ethylamine)ruthenium(II), dichlorobis(2-(diisopropylphosphino)-ethylamine)ruthenium(II), cis-dichlorobis(2,2'-bipyridine)ruthenium(II), dichloro(cycloocta-1,5-diene)ruthenium(ii), ruthenium iodide, ruthenium(III) bromide, triruthenium dodecacarbonyl, hexaammineruthenium(II) chloride, ammonium hexachlororuthenate(IV), tris(2,2'-bipyrazine)ruthenium bis(hexafluorophosphate), tris(1,10-phenanthroline-5,6-dione)ruthenium(II) bis(hexafluorophosphate), and ruthenium disulphide.

For example, the mixture ratio of the precursor of the porous 2D polymer to the metal precursor may be a molar ratio of 1:0.01 to 0.5; or 1:0.01 to 0.1. Once the mixture ratio is included in the range, the metal may be stably arranged within a crystal of the porous 2D polymer and it is possible to prevent a degradation in the catalytic activity by cohesion between metals.

For example, if the solvent is capable of dissolving and distributing the precursor of the porous 2D polymer and the metal precursor, any type of the solvent may be applicable. The solvent may include at least one selected from the group consisting of an organic solvent, such as methanol, ethanol, isopropanol, n-propanol, n-butanol, tert-butanol, dichloromthane, chloroform, acetonitrile, acetone, ether, N-methyl-2-pyrrolidone (NMP), dimethylformamide (DMF), dimethylacetamide, etc.; and water. Each of the precursor of the porous 2D polymer and the metal precursor may be slurried or dissolved in the solvent and thereby applied.

According to an example embodiment, operation S120 may be an operation of inducing the cyclization reaction and polycondensation reaction of polymer precursor under the presence of the metal precursor by performing the primary reflux on the reaction mixture.

For example, operation S120 may perform the reflux for 1 to 4 hours at the temperature of 100° C. to 200° C.; or 150° C. to 180° C.

According to an example embodiment, operation S130 may be an operation of reducing the metal precursor distributed in a porous 2D polymer matrix by adding a reducing agent and then performing the secondary reflux after operation S120.

For example, operation S130 may add and mix the reducing agent after cooling the reaction mixture to reach 90° C. or less; −4° C. to 80° C.; or 0° C. to 70° C.; 10° C. to 50° C. after operation S120.

For example, operation S130 may perform the reflux for 1 to 4 hours at the temperature of 100° C. to 200° C. For example, operation S130 of performing the secondary reflux may be performed at the same temperature as that used in operation S120 of performing the primary reflux.

According to an example embodiment, the catalyst composite manufacturing method may further include obtaining precipitate after operation S130. In operation S130, the precipitate obtained after the secondary reflux may be filtered out. For example, operation S130 may obtain the precipitate by performing filtering using a micro-porous membrane, for example, a polytetrafluoroethylene (PTFE) membrane. Also, the obtained precipitate may be dried for 1 hour to 30 hours; or 1 to 12 hours at a temperature of 60° C. to 150° C.; or 70° C. to 80° C.

According to an example embodiment, the catalyst composite manufacturing method may further include operation S140 of performing the thermal treatment after operation S130. Operation S140 may produce carbon nitride by performing the thermal treatment on the precipitate obtained through operation S130 and by strengthening and stabilizing or carbonizing loading of the metal.

Operation S140 is an operation of thermally heating the precipitate after operation S130. For example, operation S140 may perform the thermal treatment at the temperature of 300° C. or more; 400° C. or more; 500° C. or more; 550° C. to 1000° C.; 600° C. to 950° C.; or 800° C. to 900° C. When the thermal treatment is performed within the temperature range, the catalyst composite without depending on pH and having stable and excellent catalytic activity in various pH areas may be provided.

According to an example embodiment, at least one of operations included in the catalyst composite manufacturing method may be performed in an inactive gas atmosphere. The at least one operation may be, for example, operation S120 of performing the primary reflux, operation S130 of performing the secondary reflux, and/or operation S140 of performing the thermal treatment. For example, the inactive gas may be hydrogen, argon, and the like.

The example embodiment relates to a hydrogen evolution method using the catalyst composite. The hydrogen production method may include operation 210 of producing a hydrogen ion using a hydrogen evolution reaction (HER).

According to an example embodiment, operation 210 of producing the hydrogen ion may be an operation of producing the hydrogen ion by making an acidic aqueous solution; an alkaline aqueous solution; or both of them contact with the HER catalyst according to the example embodiment and by causing the HER through the contact.

For example, as shown in the following Reaction Formulas (1) to (3), hydrogen may be produced by an electrochemical hydrogen adsorption reaction (Formula 1 and Formula 2) and a chemical desorption reaction (Formula 3) according to a Tafel reaction within an acidic solution and an alkaline solution.

$$H^+ + M + e^- \leftrightarrow M-H^* \text{(acidic solution)} \quad \text{(Formula 1)}$$

$$H_2O + M + e^- \leftrightarrow M-H^* + OH^- \text{(alkaline solution)} \quad \text{(Formula 2)}$$

$$2M-H^* \leftrightarrow 2M + H_2 \text{ (acidic solution and alkaline solution)} \quad \text{(Formula 3)}$$

For example, the acidic aqueous solution may include at least one selected from the group consisting of sulfuric acid, nitric acid, phosphoric acid, hydrochloric acid, heteropolyacid, acetic acid, formic acid, malic acid, citric acid, tartaric acid, ascorbic acid, lactic acid, oxalic acid, succinic acid, tauric acid, tartaric acid, fumaric acid, and mandelic acid.

For example, the alkaline aqueous solution may include at least one selected from the group consisting of sodium hydrogencarbonate, sodium carbonate, potassium carbonate, sodium hydroxide, potassium hydroxide, calcium hydroxide, magnesium hydroxide, and ammonia water.

For example, the acidic aqueous solution and the alkaline aqueous solution may have the concentration of 0.01 to 4 N; or 0.5 to 3 N.

According to an example embodiment, the hydrogen production method may further include a process applicable in the technical field of the present disclosure without departing from the scope of the present disclosure. Herein, it is not described in detail.

Although the example embodiment is described, the present disclosure is not limited thereto. Various changes and modifications may be made without departing from the spirit and scope of the present disclosure disclosed in the claims, the detailed description, and the accompanying drawings.

Example 1

Manufacturing of catalyst composite (Ru @$C_2N$)

N-methyl-2-pyrrolidone (NMP) was added to a three-necked flask placed in an ice bath and 1.168 g of $RuCl_3$ anhydride was dissolved. In a nitrogen atmosphere (a general organic synthesis environment), 1.126 g (3.603 mmol) of hexaketocyclohexane (HKH) octahydrate ($C_6H_{16}O_{14}$, molar mass 277.5825) and 1 g (3.603 mmol) of hexaaminobenzene(HAB) trihydrochloride ($C_6H_{15}C_{13}N_6$, molar mass 312.18284) were added thereto and followed by reaction for 2 hours. Next, the ice bath was replaced with an oil bath and reflux was performed at 175° C. for 8 hours. After completion of the reaction, cooling was performed up to 80° C. and reflux was performed at 175° C. for 3 hours with 5 g of $NaBH_4$ being added thereto. After cooling to a room temperature, water was added thereto and, as a result thereof, a precipitated black solid product was collected and vacuum filtered using a PTFE membrane (0.5 μm). The remaining material was subject to Soxhlet extraction using water and methanol, and then dried under vacuum of 75° C. The dried product was thermally treated in an argon atmosphere at 900° C. for 2 hours to produce Ru @ $C_2N$. The prepared Ru @ $C_2N$ is a black solid power, and is represented in FIGS. 3A through 3E by measuring an X-ray diffraction pattern, a high-resolution transmission electron microscopy (HR-TEM), and an X-ray photoelectron spectroscopy (XPS) spectrum.

Figure 3A:
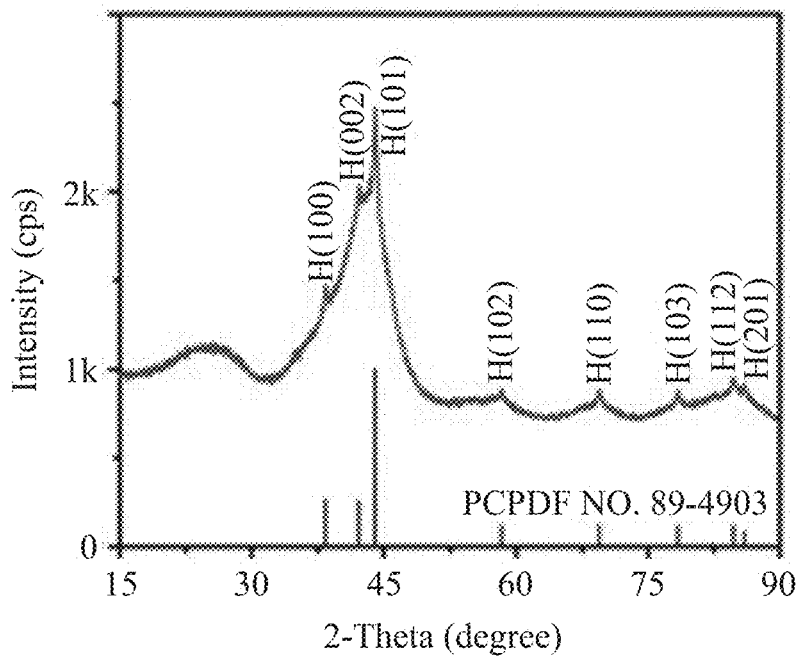
FIG. 3A is a graph showing an X-ray diffraction pattern of a catalyst composite manufactured according to Example 1 of an example embodiment.
Figure 3B:
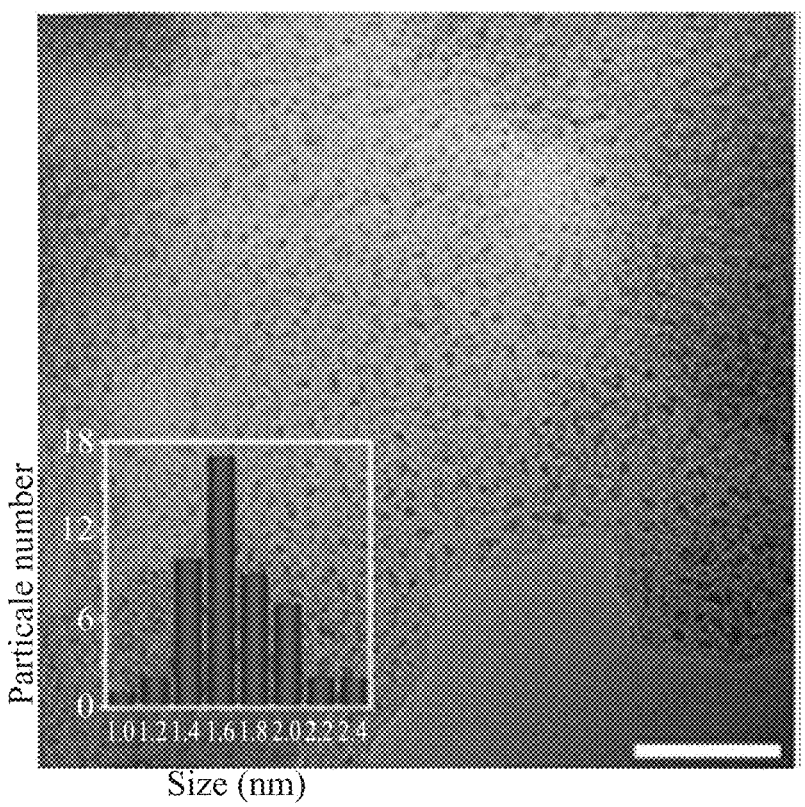
FIG. 3B illustrates a transmission electron microscope (TEM) image manufactured according to Example 1 of an example embodiment.
Figure 3C:
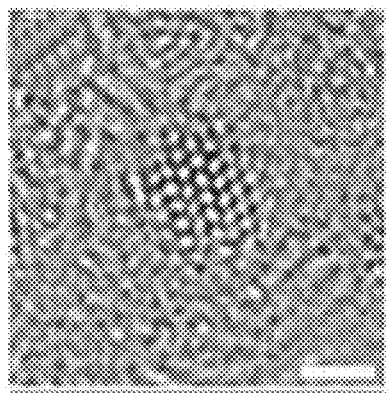
FIG. 3C illustrates a fast Fourier transform (FFT) pattern of an atomic-resolution-TEM image of the catalyst composite manufactured according to Example 1 of an example embodiment.
Figure 3D:
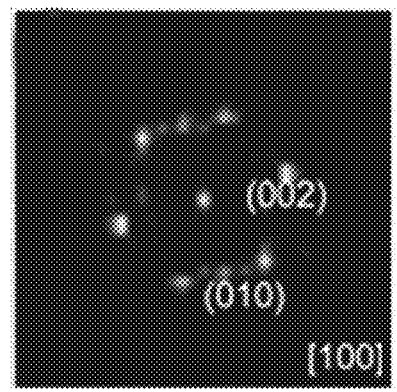
FIG. 3D illustrates an FFT pattern of an atomic-resolution-TEM image of the catalyst composite manufactured according to Example 1 of an example embodiment.
Figure 3E:
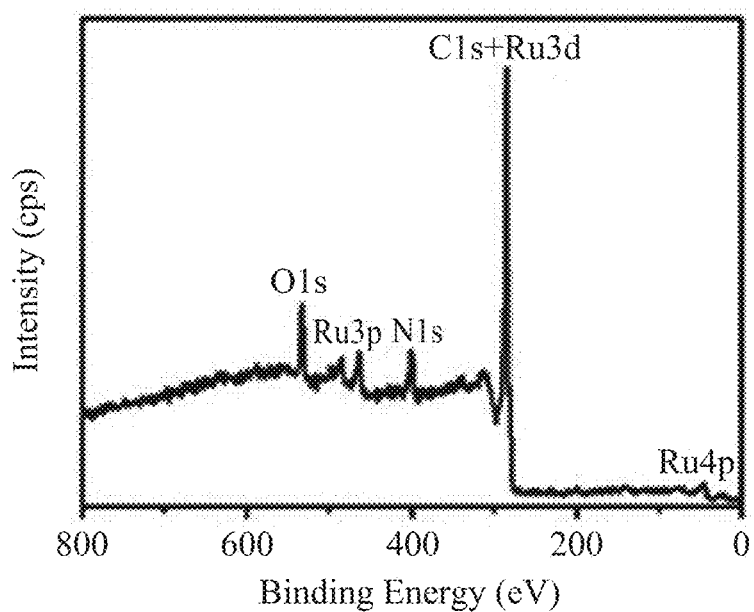
FIG. 3E is an X-ray photoelectron spectroscopy (XPS) graph of the catalyst composite manufactured according to Example 1 of an example embodiment.
Figure 3F:
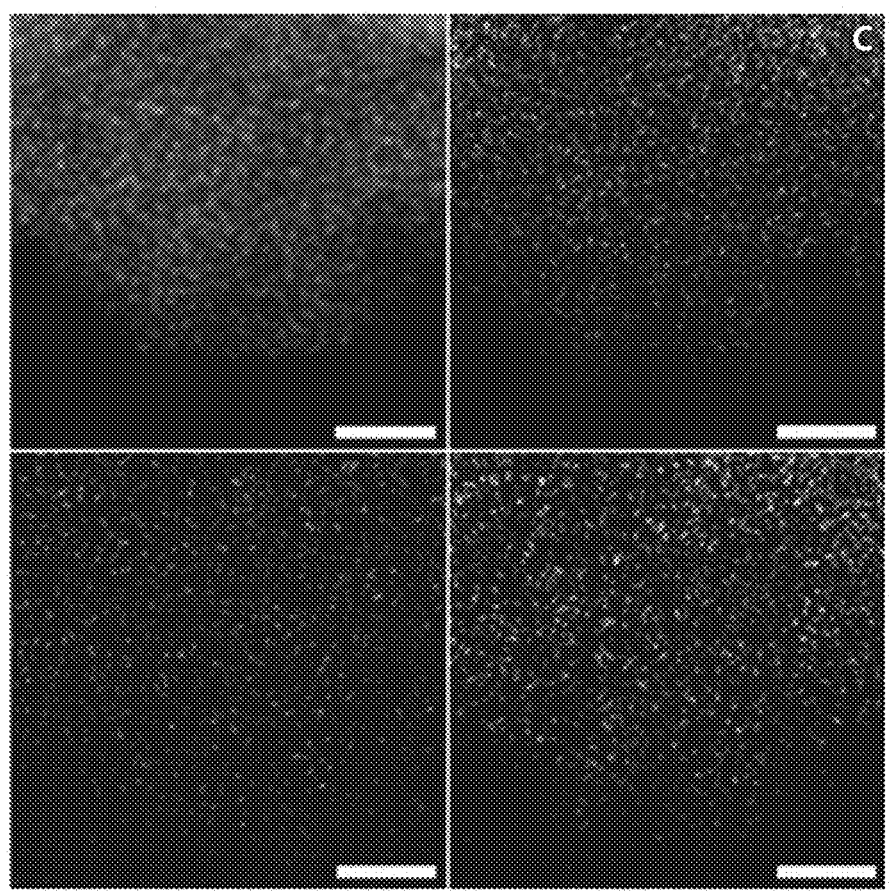
FIG. 3F illustrates scanning transmission electron microscope/scanning transmission electron microscope-energy dispersive spectrometer (STEM/STEM-EDS) atomic mapping images of the catalyst composite manufactured according to Example 1 of an example embodiment.

Referring to an X-ray diffraction graph of FIG. 3A, the peak of Ru particle corresponding to hexagonal Ru (PCPDF No. 89-4903) was verified and the broad peak of 25.09° corresponds to $C_2N$. The distribution of C, N, and Ru elements was confirmed from a transmission electron microscopy (TEM) image of FIG. 39, fast Fourier transform (FFT) patterns of atm resolution-TEM images of FIGS. 3C and 3D, and scanning transmission electron microscope/ scanning transmission electron microscope-energy dispersive spectrometer (STEM/STEM-EDS) element mapping images of FIG. 3F. Also, it can be verified therefrom that Ru nano particles were uniformly distributed in a 2D polymer $C_2N$ framework and Ru nano particles of 2.4 nm or less were formed. Also, C 1s, Ru 3d, N 1s, O 1s and Ru 3p spectra were verified from the XPS spectrum of FIG. 3E. It indicates that Ru was bound in the $C_2N$ 2D matrix.

Examples 2 to 5

Except that thermal treatment was performed at each of 600° C., 700° C., 800° C., and 1000° C., Ru @$C_2N$ catalyst composite was prepared using the same method as that used in Example 1.

Comparative Example 1

Except that a metal salt and a reducing agent were not used, the 2D polymer of the $C_2N$ matrix was prepared using the same method as that used in Example 1.

Comparative Examples 2 to 5

Except that each metal salt shown in Table 1 was applied, a catalyst composite was prepared using the same method as Example 1.

TABLE 1

| | Comparative Example 2 | Comparative Example 3 | Comparative Example 4 | Comparative Example 5 |
|---|---|---|---|---|
| Metal salt | $NiCl_2$ | $CoCl_2$ | $PbCl_2$ | $PtCl_2$ |
| Catalyst composite | Ni@$C_2N$ | Co@$C_2N$ | Pd@$C_2N$ | Pt@$C_2N$ |

Experimental Example 1

Figure 4A:
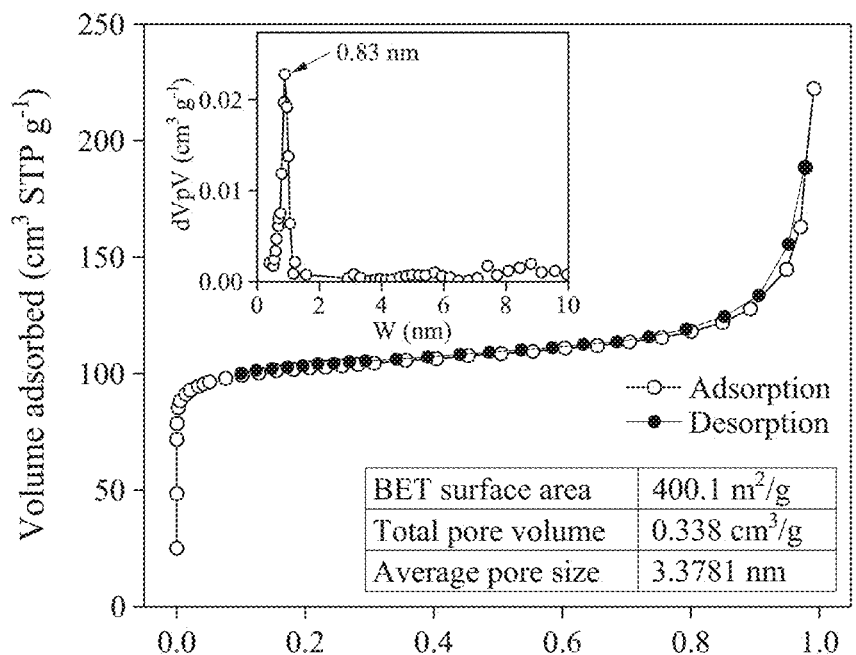
FIG. 4A is a Brunauer-Emmett-Teller (BET) graph of a catalyst composite manufactured according to Example 1 and Comparative Example 1.
Figure 4B:
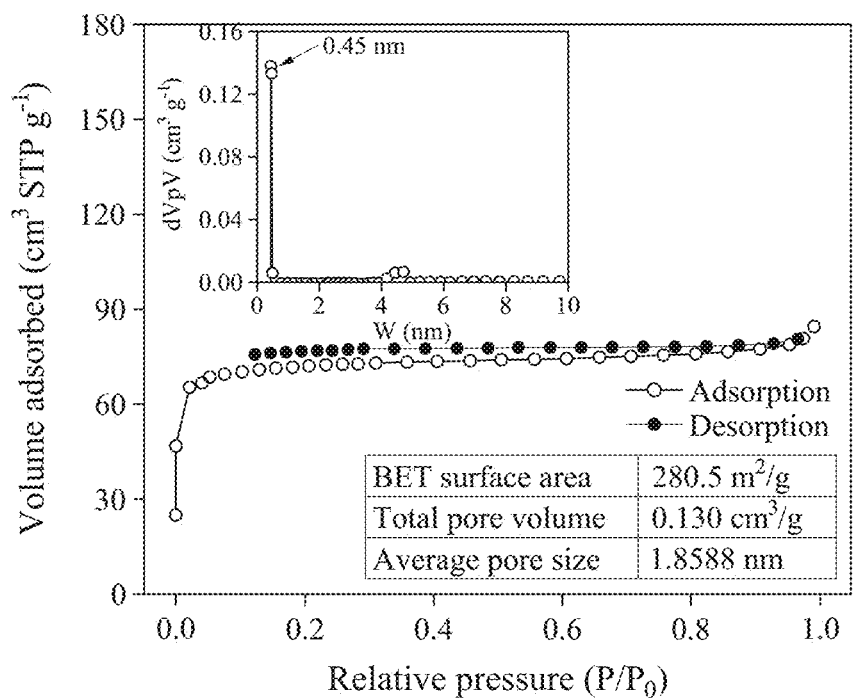
FIG. 4B is a BET graph of the catalyst composite manufactured according to Example 1 and Comparative Example 1.

Measurement of Brunauer-Emmett-Teller (BET) Graph $N_2$ adsorption/desorption isotherms were measured using the BET method of Example 1 and Comparative Example 1 and were represented in FIGS. 4A and 4B. Referring to FIGS. 4A and 4B, it can be verified that Ru@$C_2N$ of Example 1 has the surface area of 400.1 $m^2 g^{-1}$, the pore volume of 0.338 $cm^3 g^{-1}$, and the average spore size of 3.37 nm. The $C_2N$ matrix of Comparative Example 1 has the surface area of 280.5 $m^2 g^{-1}$ and the average pore size of 0.83 nm. Accordingly, it can be verified that Ru @$C_2N$ of Example 1 has a relatively great surface and pore size compared to the $C_2N$ matrix of Comparative Example 1. It is because abundant coordination sites for the uniform distribution of Ru between $C_2N$ layers were provided due to growth and nucleation of Ru nano particles within the $C_2N$ framework.

Experimental Example 2

Measurement of HER Performance

HER activity and stability of the electrochemical catalyst with respect to Example 1 (Ru@$C_2N$), Comparative Examples 2 to 5 (Co@$C_2N$, Ni@$C_2N$, Pd@$C_2N$, and Pt@$C_2N$), and Pt/C (Aldrich Chemical Inc., 738549) were measured.

(1) Measurement of HER Performance within 0.5 M $H_2SO_4$ Aqueous Solution

Polarization curves were measured before and after 10,000 potential cycles from 0.2 to −0.1 V (vs RHE) within the 0.5 M $H_2SO_4$ aqueous solution. Here, the electrode rotational speed was 1600 r.p.m.; and the scan speed was 5 $mV\ s^{-1}$. The results thereof are shown in FIGS. 5A through 5D.

Figure 5A:
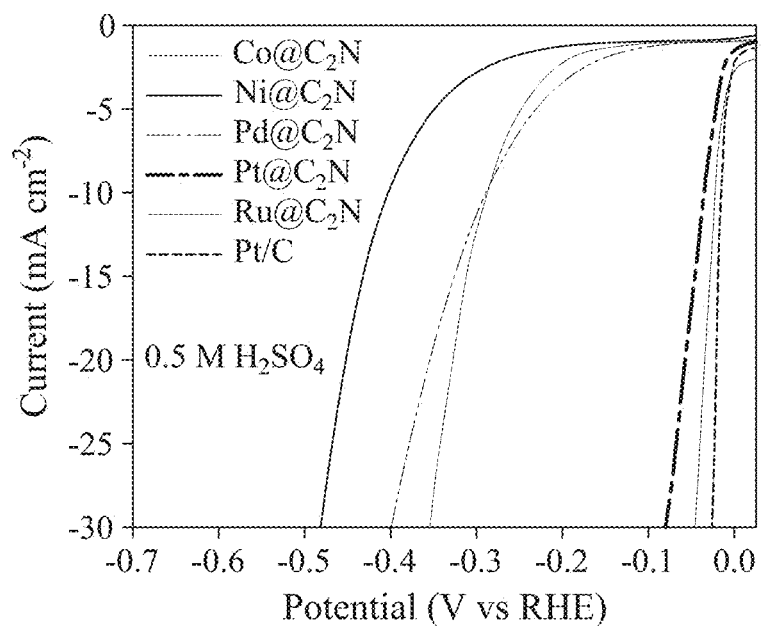
FIG. 5A is a graph showing polarization curves in 0.5 M aq. H2SO4 environment of Example 1, Comparative Examples 2 to 5, and Pt/C catalyst.
Figure 5B:
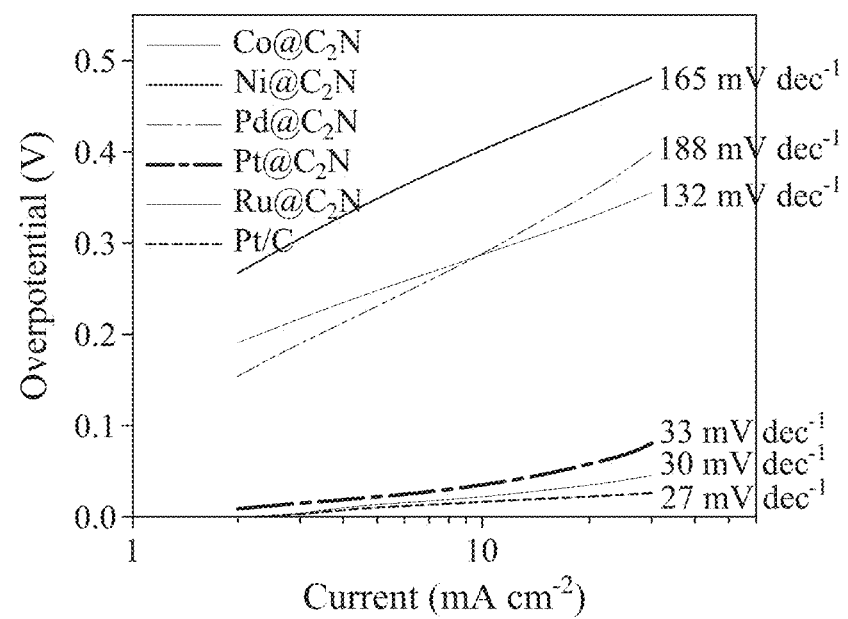
FIG. 5B is a graph showing a Tafel plot about the polarization curves of FIG. 5A.
Figure 5C:
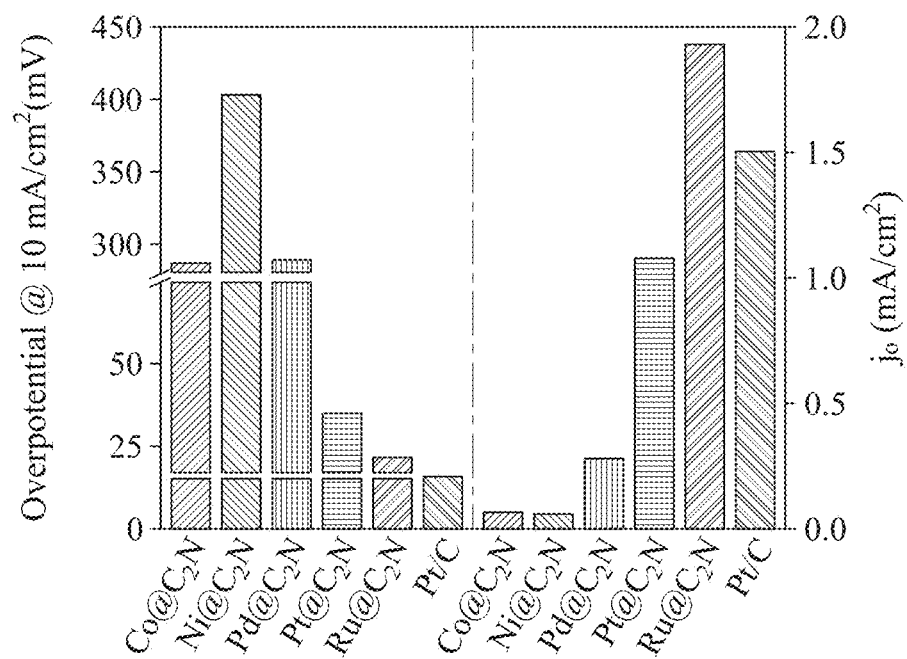
FIG. 5C illustrates overpotential @ 10 mA cm-2 (left) and alternating current density (right) in 0.5 M aq. H2SO4 environment of Example 1, Comparative Examples 2 to 5, and Pt/C catalyst.
Figure 5D:
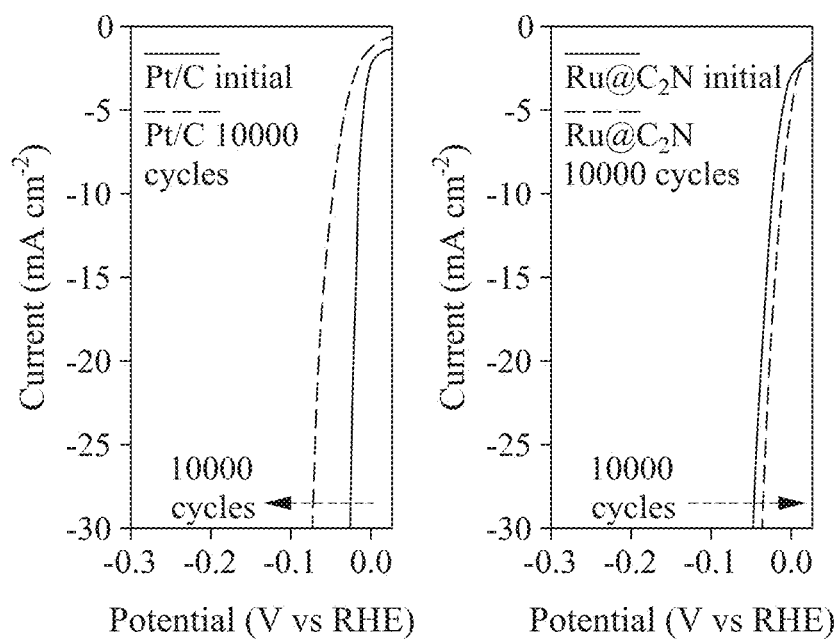
FIG. 5D illustrates current before and after 10,000 potential cycles in 0.5 M aq. H2SO4 environment of Example 1, Comparative Examples 2 to 5, and Pt/C catalyst.

The graph of FIG. 5A shows polarization curves, the graph of FIG. 5B shows the Tafel plot about the polarization curves of FIG. 5A, the graphs of FIG. 5C show overpotential @ 10 mA $cm^{-2}$ (left) and AC density (right), and the graphs of FIG. 5D show the durability thereof. Referring to FIGS. 5A through 5D, Ru@$C_2N$ of Example 1 shows the significantly low overpotential of 9.5 mV (vs. RHE) and excellent electrocatalytic activity compared to those of Co@$C_2N$, Ni@$C_2N$, Pd@$C_2N$, and Pt@$C_2N$. In addition, Ru@$C_2N$ of Example 1 shows the very low overpotential at the current density of 10 mA $cm^{-2}$ (22 mV). Also, the Tafel slope of Ru@$C_2N$ of Example 1 is 30 mV $decade^{-1}$, which is slightly greater than Pt/C (27 mV $decade^{-1}$).

Also, as a result of the Tafel plot, the AC density of Ru@$C_2N$ of Example 1 was measured as 1.9 mA $cm^{-2}$, which is a significantly great value compared to those of Co@$C_2N$, Ni@$C_2N$, Pd@$C_2N$, Pt@$C_2N$, and Pt/C (1.5 mA $cm^{-2}$). Since relatively great efficiency is provided with a small amount according to an increase in the current density, it indicates that Ru@$C_2N$ of Example 1 has very excellent electrocatalytic activity.

In addition, regarding the electrochemical stability according to the long-term cycle experiment within 0.5 M aq. $H_2SO_4$ solution of Pt/C and Ru@$C_2$N, the polarization curves of Pt/C moved to the negative of 47 mV or more (current density of 10 mA $cm^{-2}$) after 10,000 CV cycles. It indicates a sharp decrease in the electrocatalytic activity. On the contrary, the polarization curves of Ru@$C_2$N of Example 1 show the positive movement of 10 mV (current density of 10 mA $cm^{-2}$) without negative movement. It indicates that Ru@$C_2$N of Example 1 has excellent electrochemical stability and high catalytic activity and efficiency during the long-term electrochemical process.

(2) Measurement of HER Performance within 1.0 M KOH Aqueous Solution

Polarization curves were measured before and after 10,000 potential cycles from 0.2 to −0.1 V (vs RHE) within the 1.0 M KOH aqueous solution. The electrode rotational speed was 1600 r.p.m.; and the scan speed was 5 mV $s^{-1}$. The results thereof are shown in FIGS. 6A and 6B.

Figure 6A:
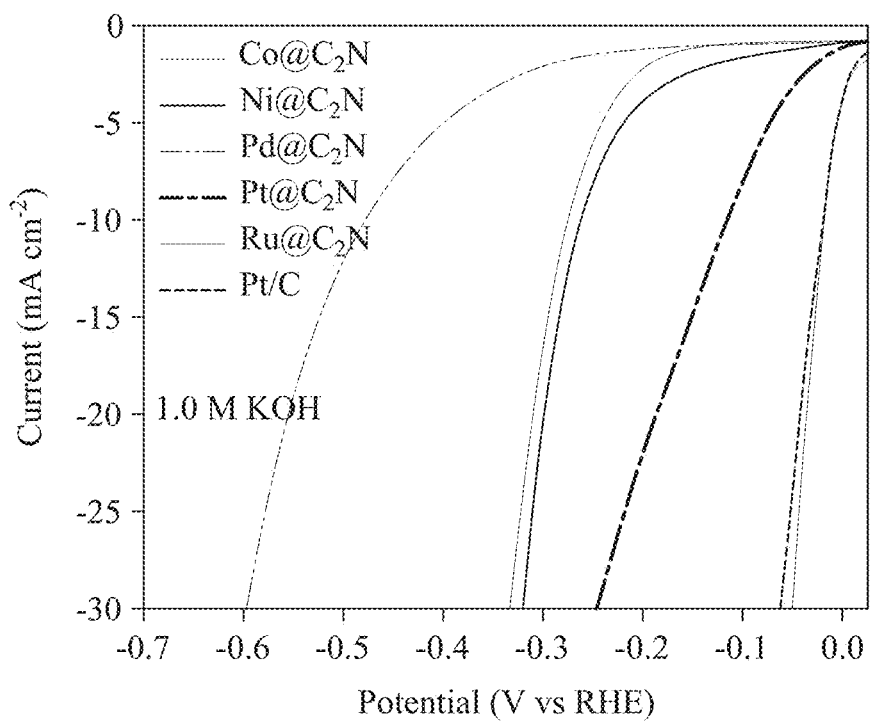
FIG. 6A is a graph showing polarization curves in 1.0 M KOH environment of Example 1, Comparative Examples 2 to 5, and Pt/C catalyst.
Figure 6B:
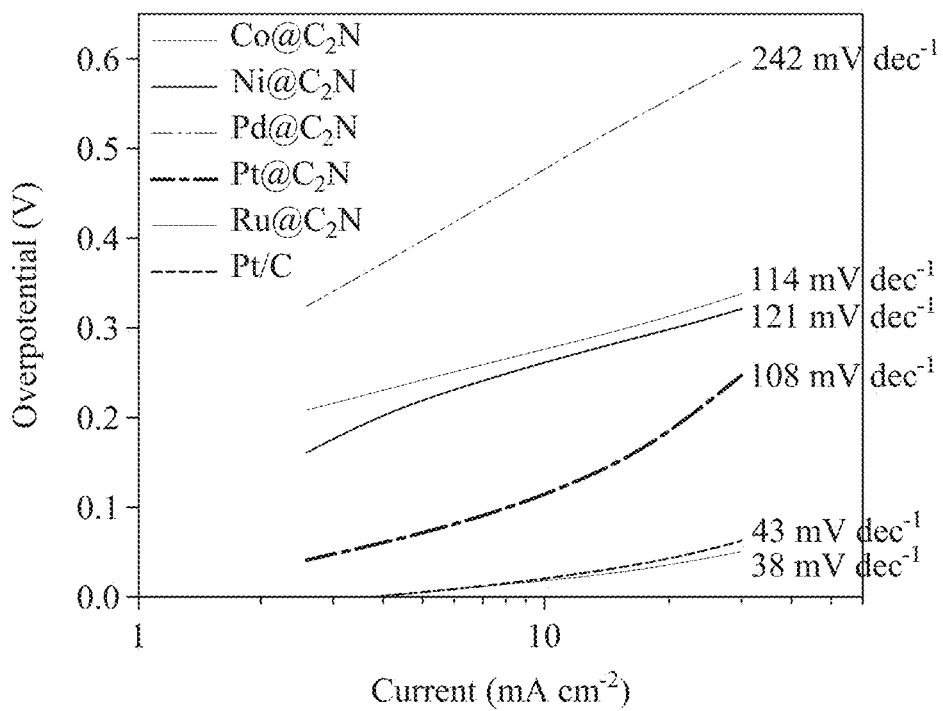
FIG. 6B is a Tafel plot about the polarization curves in 1.0 M KOH environment of Example 1, Comparative Examples 2 to 5, and Pt/C catalyst.

The graph of FIG. 6A shows the polarization curves and the graph of FIG. 6B shows the Tafel plot about the polarization curves of FIG. 6A. Referring to FIGS. 6A and 6B, Ru@$C_2$N of Example 1 shows significantly low 17.0 mV (current density of 10 mA $cm^2$) overpotential compared to Co@$C_2$N, Ni@$C_2$N, Pd@$C_2$N, and Pt@$C_2$N. Also, the Tafel slope of Ru@$C_2$N is 38 mV $decade^{-1}$, which is a numerical value less than those of Co@$C_2$N, Ni@$C_2$N, Pd@$C_2$N, and Pt@$C_2$N. Also, the overpotential and the Tafel slope of Example 1 show relatively low values compared to those of Pt/C. That is, it indicates that Ru@$C_2$N has very excellent electrocatalytic activity with a relatively small overpotential in an alkaline environment, compared to other metal catalysts and Pt/C.

Experimental Example 3

Turnover frequency (number of molecules reacting per unit time) (TOF, $s^{-1}$)

TOF ($s^{-1}$) was calculated according to the following Equation.

$$TOF = I/(2Fn)$$ Equation 1

In Equation 1, I denotes current A in linear sweep measurement, F denotes Faraday constant (C $mol^{-1}$), and n denotes a number of active sites (mol). Factor ½ considers two electrons required to form a single hydrogen molecule.

Figure 7A:
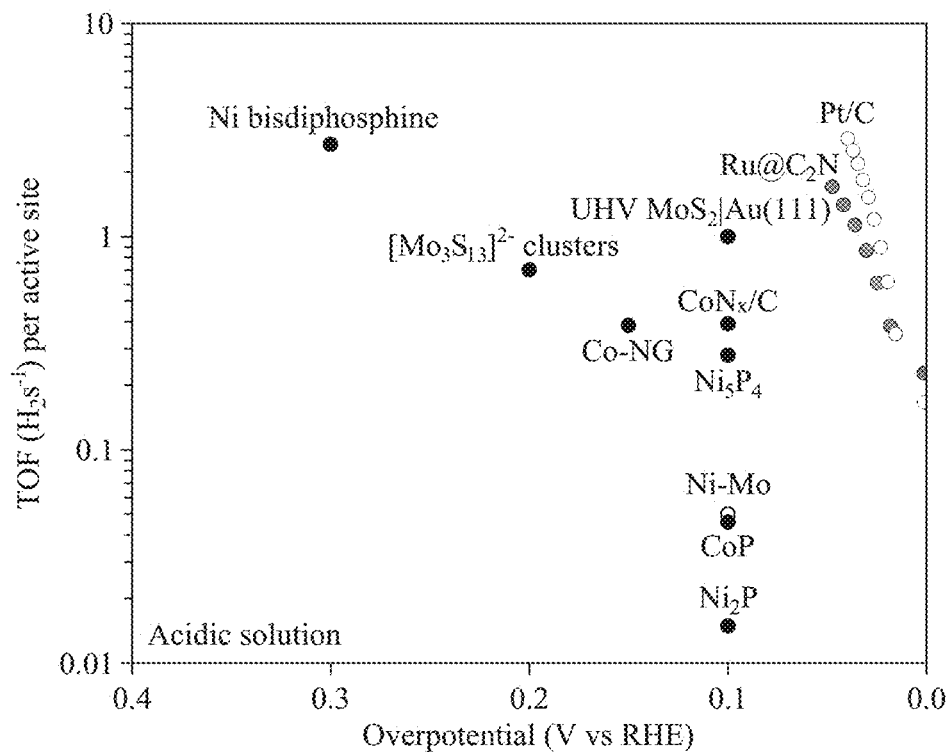
FIG. 7A is a graph showing a turnover frequency (TOF) s-1 value in an acidic solution of Example 1 and another metal catalyst.
Figure 7B:
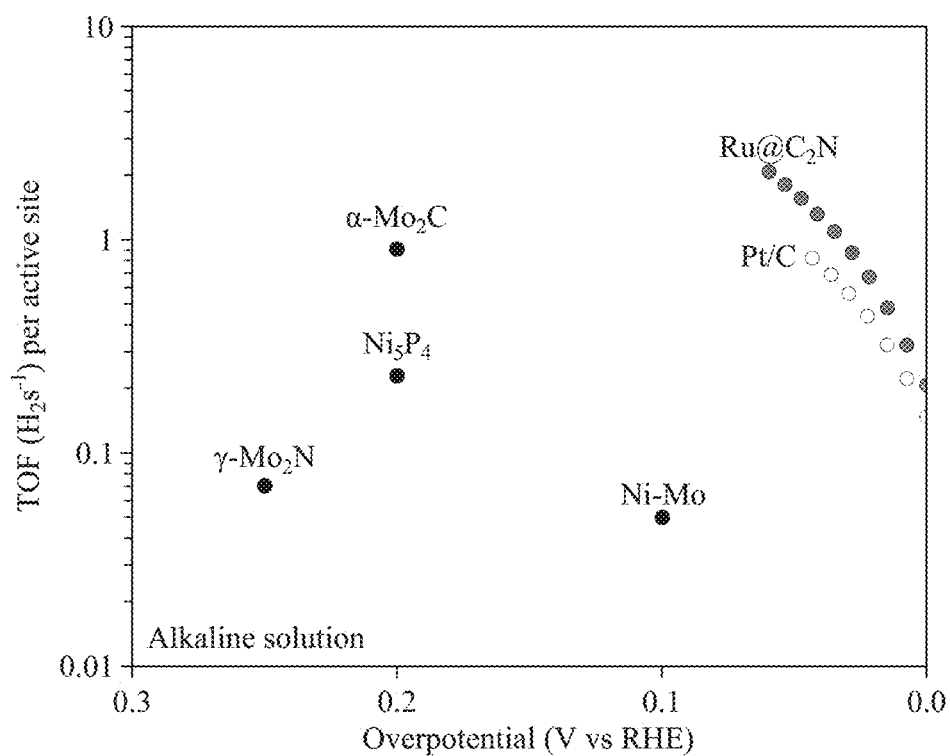
FIG. 7B is a graph showing a turnover frequency (TOF) s-1 value in an alkaline solution of Example 1 and another metal catalyst.

In the 0.5 M $H_2SO_4$ solution and the 1.0 M KOH solution of Ru@$C_2$N of Example 1 and Pt/C, TOF and overpotential and TOF of HER electrochemical catalyst were compared and the results thereof are shown in FIGS. 7A and 7B.

FIGS. 7A and 7B show TOF values in the 0.5 M $H_2SO_4$ solution and the 1.0 M KOH solution of Ru@$C_2$N and Pt/C. FIGS. 7C and 7D show the overpotential (10 mA $cm^2$) in the 0.5 M $H_2SO_4$ solution and the 1.0 M KOH solution. TOF and overpotential of other catalysts excluding Ru@$C_2$N and Pt/C are values that have been reported.

Referring to FIGS. 7A and 7B, in the 0.5 M aq. $H_2SO_4$ solution, Ru@$C_2$N has TOF values of 0.67 and 1.95 $H_2 s^{-1}$ at 25 and 50 mV (vs. HRE), respectively. The TOF values are significantly great compared to those of other reported electrochemical catalysts. The TOF values of Ru@$C_2$N are slightly small compared to those of Pt/C since $C_2$N layer coating is performed on and below Ru.

In the 1.0 M aq. KOH solution, TOF values of Ru@$C_2$N are 0.76 $H_2 s^{-1}$ @25 mV and 1.66 $H_2 s^{-1}$@50 mV, which are significantly increased numerical values compared to those of Pt/C (0.47 $H_2 s^{-1}$@25 mV, 0.95 $H_2 s^{-1}$@50 mV) and other catalysts. Accordingly, Ru@$C_2$N of Example 1 provides a high TOF value at a low overpotential.

Figure 8A:
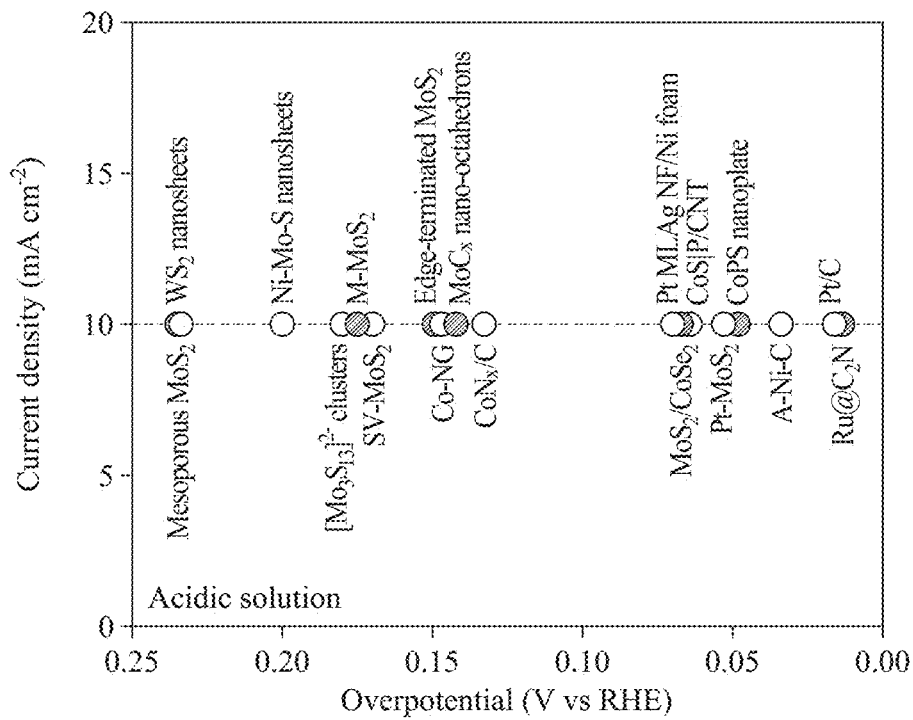
FIG. 8A is a graph showing an overpotential value in 10 mA cm-2 after 10,000 CV cycles in an acidic solution of Example 1 and another metal catalyst.
Figure 8B:
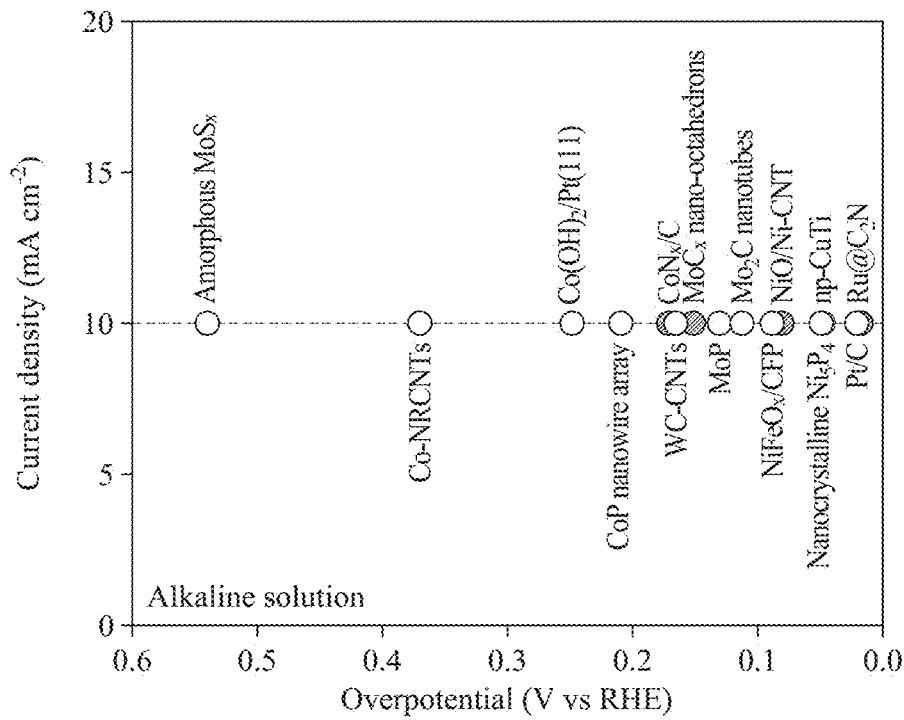
FIG. 8B is a graph showing an overpotential value in 10 mA cm-2 after 10,000 CV cycles in an alkaline solution of Example 1 and another metal catalyst.

Referring to FIGS. 8A and 8B, in the 0.5 M aq. $H_2SO_4$ solution and the 1.0 M aq. KOH solution, Ru@$C_2$N of Example 1 has overpotential of 13.5 mV (0.5 M aq. $H_2SO_4$ solution) and 17.0 mV (1.0 M aq. KOH solution) at 10 mA $cm^{-2}$ after 10,000 CV cycles. They are significantly low numerical values compared to those of other reported catalysts and slightly small compared to those of Pt/C (16.0 mV in the 0.5 M aq. $H_2SO_4$ solution; 20.7 mV in the 1.0 M aq. KOH solution). Accordingly, in acidic and alkaline environments, Ru@$C_2$N of Example 1 may exhibit a low overpotential with respect to a predetermined current density and may also provide excellent performance comparable to that of Pt catalyst.

That is, since Ru@$C_2$N of Example 1 exhibits high turnover frequencies in the 25 mV, 0.5 M sulfuric acidic aqueous solution and exhibits low overpotential and excellent stability in the 13.5 mV, 0.5 M sulfuric acid solution and the 1.0 M KOH aqueous solution, Ru@$C_2$N of Example 1 may provide HER performance as a low-cost metal catalyst having the excellent performance regardless of pH.

Experimental Example 4

Polarization curves were measured before and after 10,000 potential cycles from 0.2 to −0.1 V (vs RHE) in the 0.5 M $H_2SO_4$ aqueous solution of Ru@$C_2$N of Comparative Examples 6 and 7. The measured overpotential and TOF values are shown in Table 2.

TABLE 2

|  | Example 1 | Example 2 | Example 3 | Example 4 | Example 5 |
| --- | --- | --- | --- | --- | --- |
| Thermal treatment temperature (° C.) | 900° C. | 600° C. | 700° C. | 800° C. | 1000° C. |
| overpotential (@ 10 mA $cm^{-2}$) | 13.5 mV | 210 mV | 107 mV | 51 mV | 51 mV |
| TOF@ 50 mV (vs. HRE) | 1.95 $H_2 s^{-1}$ | 0.056 $H_2 s^{-1}$ | 0.18 $H_2 s^{-1}$ | 0.54 $H_2 s^{-1}$ | 0.55 $H_2 s^{-1}$ |

Referring to Table 2, according to an increase in the thermal treatment temperature, the overpotential decreases and the TOF value increases. Thus, it can be verified that the catalyst performance increases according to an increase in the thermal treatment temperature.

According to example embodiments, there may be provided a catalyst composite that may provide an excellent catalytic activity with respect to HER simultaneously in acid and alkaline environments without depending on pH and that may have excellent durability without degrading the performance n. In particular, according to example embodiments, when applied to HER, it is possible to achieve a relatively low overpotential compared to an existing catalyst and a precious metal catalyst and to proceed with the HER at a high efficiency.

Although the disclosure is described with some example embodiments and drawings, the disclosure is not limited thereto and it will be understood to those of ordinary skill in the art that various changes and modifications are possible from the description. Therefore, the scope of the disclosure is defined not by the example embodiments, but by the claims and their equivalents.

What is claimed is:

1. A catalyst composite comprising:
(i) ruthenium (Ru);
(ii) at least one selected from the group consisting of cerium (Ce), iron (Fe), rhodium (Rh), palladium (Pd), cobalt (Co), nickel (Ni), gold (Au), silver (Ag), manganese (Mn), zinc (Zn), copper (Cu), and molybdenum (Mo); and
(iii) a nitrogen-containing porous two-dimensional (2D) polymer carrier;
wherein a ratio of the ruthenium to all other metal is a molar ratio of 1:0.01 to 1:0.5; and
wherein the nitrogen-containing porous two-dimensional (2D) polymer carrier comprises six aromatic rings arranged to form a hole and a diameter of the hole is 0.1 nm to 10 nm.

2. The catalyst composite of claim 1, wherein the nitrogen-containing porous 2D polymer carrier is a 2D porous organic produced through a cyclization reaction of an amine-based compound; and at least one of a ketone-based compound, an aldehyde-based compound, and a carboxylic acid-based compound, 2D porous carbon nitride, or both thereof.

3. The catalyst composite of claim 2, wherein the amine-based compound comprises at least one selected from the group consisting of hexaaminobenzene, hexaaminobenzene (HAB) trihydrochloride, triphenylene hexaamine triptycene hexamine, tetraaminobenzene, p-phenylenediamine, m-phenylenediamine, aromatic diamine, melamine, adamantanetetraamine, ethylenediamine, pyridinetetramine, 1,3,5-tris(4-aminophenyl)benzene, [1,1'-biphenyl]-3,3',4,4'-tetraamine, naphthalene-tetraamine, 4,4'-oxydianiline, 4,4'-thiodianiline, 4,4'-thiobis(benzene-1,2-diamine), 4,4'-oxybis(benzene-1,2-diamine), pyrenediamine, pyrenetetramine, and 4,4',4'',4'''-methanetetrayltetraaniline.

4. The catalyst composite of claim 2, wherein the ketone-based compound comprises at least one of hexaketocyclohexane, hexaketocyclohexane (HKH) octa hydrate, tetraketone, and pyreneteteraketone,
the aldehyde-based compound comprises at least one of benzenedialdehyde and benzenetrialdehyde, and
the carboxylic acid-based compound comprises at least one of benzenedicarboxylic acid, benzenetricarboxylic acid, benzenetetracarboxylic acid, benzenehexacarboxylic acid, pyromellitic dianhydride, mellitic anhydride, cyclobutane-1,2,3,4-tetracarboxylic dianhydride, perylenetetracarboxylic dianhydride, naphthalenetetracarboxylic dianhydride, perylenetetracarboxylic acid, and naphthalenetetracarboxylic acid.

5. The catalyst composite of claim 1, wherein the ruthenium comprises a metal particle having a particle size of 100 nm or less.

6. The catalyst composite of claim 1, wherein the catalyst composite is a hydrogen evolution reaction (HER) catalyst.

7. The catalyst composite of claim 1, wherein the catalyst composite has a catalytic activity for hydrogen evolution reaction in an area of pH 1 to 14.

8. A method of manufacturing a catalyst composite, the method comprising:
obtaining a reaction mixture by mixing a precursor of porous two-dimensional (2D) polymer and a metal precursor in a solvent;
performing a primary reflux on the reaction mixture; and
performing a secondary reflux after adding a reducing agent,
wherein the catalyst composite comprises:
(i) ruthenium (Ru);
(ii) at least one selected from the group consisting of cerium (Ce), iron (Fe), rhodium (Rh), palladium (Pd), cobalt (Co), nickel (Ni), gold (Au), silver (Ag), manganese (Mn), zinc (Zn), copper (Cu), and molybdenum (Mo); and
(iii) a nitrogen-containing porous two-dimensional (2D) polymer carrier;
wherein a ratio of the ruthenium to all other metal is a molar ratio of 1:0.01 to 1:0.5; and
wherein the nitrogen-containing porous two-dimensional (2D) polymer carrier comprises six aromatic rings arranged to form a hole and a diameter of the hole is 0.1 nm to 10 nm.

9. The method of claim 8, wherein the precursor of the porous 2D polymer comprises an amine-based compound; and at least one of a ketone-based compound, an aldehyde-based compound, and a carboxylic acid-based compound.

10. The method of claim 8, wherein a mixture ratio of the amine-based compound to at least one of a ketone-based compound, an aldehyde-based compound, and a carboxylic acid-based compound is a molar ratio of 1:0.5 to 3.

11. The method of claim 8, wherein the metal precursor comprises at least one selected from the group consisting of a halogen salt, a phosphate salt, a nitrate salt, a sulfate salt, an ammonium salt, an acetate salt, and a carbonate salt of a metal.

12. The method of claim 8, wherein a mixture ratio of the precursor of the porous 2D polymer to the metal precursor is a molar ratio of 1:0.01 to 0.5.

13. The method of claim 8, wherein the reducing agent comprises at least one selected from the group consisting of $NaBH_4$, $NaAlH_4$, $LiBH_4$, $LiAlH_4$, hydrazine, $KBH_4$, and $LiBH_4$.

14. The method of claim 8, further comprising:
thermally treating a product obtained after performing the secondary reflux.

15. The method of claim 14, wherein the thermally treating comprises thermally treating the product in an inert gas atmosphere and at the temperature of 400° C. or more.

* * * * *